United States Patent [19]

Comte et al.

[11] 4,337,019
[45] Jun. 29, 1982

[54] MACHINE FOR MANUFACTURING DISKS ON A ROD

[75] Inventors: Georges N. Comte, Lyons; André Appriou, Tassin la Demi-Lune; Jean Couturier, Craponne, all of France

[73] Assignee: Les Cables de Lyon, Lyons, France

[21] Appl. No.: 243,667

[22] Filed: Mar. 13, 1981

[30] Foreign Application Priority Data

Mar. 14, 1980 [FR] France ............................... 80 05769

[51] Int. Cl.³ ............................................ B29C 6/00
[52] U.S. Cl. .................................. 425/116; 425/121; 425/129 R
[58] Field of Search ............... 425/116, 110, 121, 122, 425/129 R

[56] References Cited

U.S. PATENT DOCUMENTS

| | | | |
|---|---|---|---|
| 1,939,894 | 12/1933 | Goodwin | 425/116 R |
| 2,513,609 | 7/1950 | Werner | 425/116 |
| 2,742,670 | 4/1956 | Morin | 425/129 R X |
| 2,760,228 | 8/1956 | Verges | 425/129 R X |
| 3,454,984 | 7/1969 | Alberts | 425/129 R |
| 4,278,625 | 7/1981 | Dedolph | 425/116 X |

Primary Examiner—J. Howard Flint, Jr.
Attorney, Agent, or Firm—Sughrue, Mion, Zinn, Macpeak & Seas

[57] ABSTRACT

A machine for manufacturing disks on a very long rod, said machine including two conveyor-driven chains of moulding units that press against one another and receive said rod therebetween in an area provided with at least one orifice for injecting a plastics substance into a cavity formed between a pair of mating units, one from each chain, the units then parting to release a disk-shaped part moulded onto said very long rod. At least one of the sets of moulding units has a so-called "hermaphrodite" unit (1) with leading tabs 8 and trailing tabs (10) for fixing to its adjacent units in the chain. The tabs are such that they allow the "hermaphrodite" unit to be inserted between a female unit and a male unit or between two other hermaphrodite units. Applications to manufacturing insulator disks on the central conductor of a coaxial cable.

5 Claims, 4 Drawing Figures

MACHINE FOR MANUFACTURING DISKS ON A ROD

The present invention relates to a machine for manufacturing disks on a very long rod, said machine including two conveyor-driven chains of moulding units that press against one another and receive said rod therebetween in an area provided with at least one orifice for injecting a mouldable substance into a cavity formed between a pair of mating units, one from each chain, the units then parting to release a disk-shaped part moulded onto said very long rod.

BACKGROUND OF THE INVENTION

Machines have been designed for moulding plastic disk insulators onto an axial conductor during the manufacture of coaxial cables. Such machines made up till now have male and female moulding units constituting links which alternate along two chains of moulding units, such that a stud on a male moulding unit in one of the chains fits into a hollow in a female moulding unit in the other chain and thereby aligns the half-shells of the moulding units in each chain at the instant when they come in front of a plastic injection hole. A male unit in such a machine has a set of inner fixing tabs at each of its ends to engage on the inner sides of fixing tabs at the connecting ends of the adjacent female units. Each pair of engaging tab sets is connected together by a pin.

The result of this is that both of the chains must have an even number of links. This restricts the choice of combinations of units, and it is these combinations which make it possible to limit accumulation of defects due to unevenness in moulding the disk insulators. Such defects degrade the transmission of high-frequency signals much more if both chains have the same number of units, and the effect still remains appreciable even when the two chains differ by an even number of units.

Preferred embodiments of the present invention provide a machine for manufacturing inserts in the shape of disks on a very long rod such that any number of moulding units can be included in each chain, in particular an odd number. Further such embodiments provide a manufacturing machine whose chains of units can differ by an odd number of units and in particular by one unit thereby reducing as far as possible degradation of high-frequency signal transmission due to defects in the moulding units.

SUMMARY OF THE INVENTION

In the machine according to the invention, at least one of the chains of moulding units has at least one so-called "hermaphrodite" moulding unit with leading tabs and trailing tabs for fixing to its adjacent units, the gap between its leading tabs being different from the gap between its trailing tabs, and these two gaps being such that they allow said "hermaphrodite" unit to be between a unit with a wide gap between its tabs, here called a "female" unit, and a unit with a narrow gap between its tabs, here called a "male" unit, or between two other, like, hermaphrodite units.

Preferably, the machine according to the invention further includes at least one of the following features:

one of the chains of units has a number of units that differs from that of the other chain of units, the difference being an odd number of hermaphrodite units and preferably by one unit.

each unit of each chain has a stud and a corresponding hollow, both being located on its surface facing a unit of the other chain, which stud and hollow mate with a corresponding hollow and stud of a unit in the other chain.

each unit of a first chain has a stud and each unit of the other chain has a hollow which mates with the stud of the corresponding unit of the first chain.

BRIEF DESCRIPTION OF THE DRAWINGS

Moulding units of a machine in accordance with the invention for manufacturing insulating disks on a coaxial cable are described hereinbelow by way of example and with reference to the figures of the accompanying drawing, in which.

DESCRIPTION OF PREFERRED EMBODIMENTS

Figure 1:
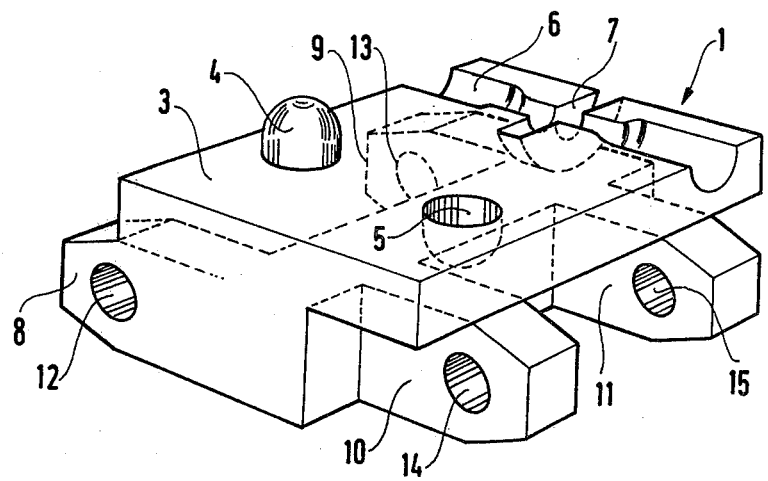
FIG. 1 is a perspective view of one hermaphrodite chain unit.

In FIG. 1, moulding unit 1 has a plane upper surface 3 with a stud 4 and a hollow 5. The stud and the hollow are designed to co-operate with a corresponding stud and a corresponding hollow of another, facing, moulding unit, (not shown). A chain of units which includes the unit 1 and another chain of similar units are designed to form the main components of a machine for manufacturing disk insulators, the chain which contains the unit 1 being a lower chain and the other being an upper chain, and the respective components pressing against each other in a horizontal plane.

The unit 1 further has both a recess 6 to receive a central conductor on which the disk insulators are to be moulded, and a cavity 7 for moulding the disks themselves by injecting a plastics substance. (The recess 6 and the cavity 7 must co-operate with the corresponding recess and cavity of a unit in the upper chain to close the conductor recess and the insulator disk moulding cavity).

Further, the leading edge of the unit 1 has a set of outer fixing tabs 8 and 9 and the trailing edge of said unit has a set of inner fixing tabs 10 and 11. These tabs are designed to connect said unit respectively with the preceding unit and with the following unit. The outer leading tabs 8 and 9 have bores 12 and 13 and the inner trailing tabs 10 and 11 have bores 14 and 15 to receive link pins.

Figure 2:
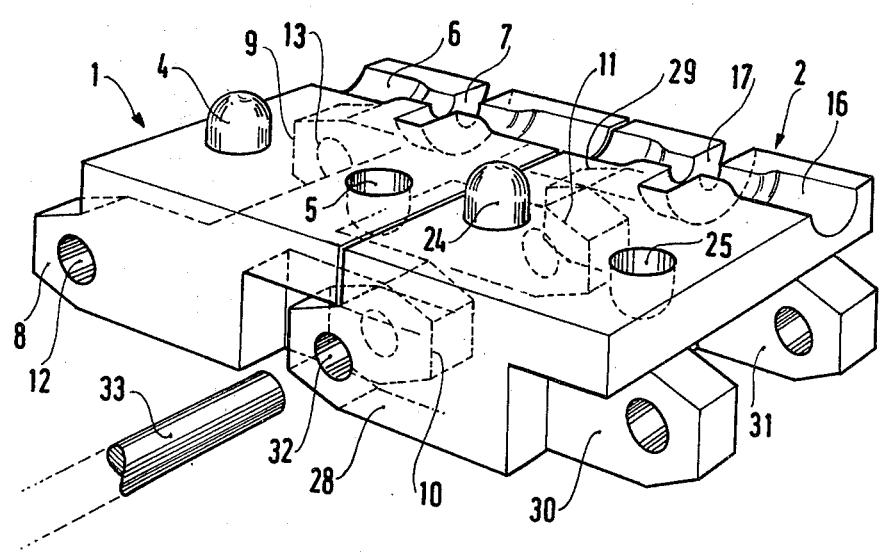
FIG. 2 is a perspective view of two hermaphrodite chain units connected end to end.
Figure 3:
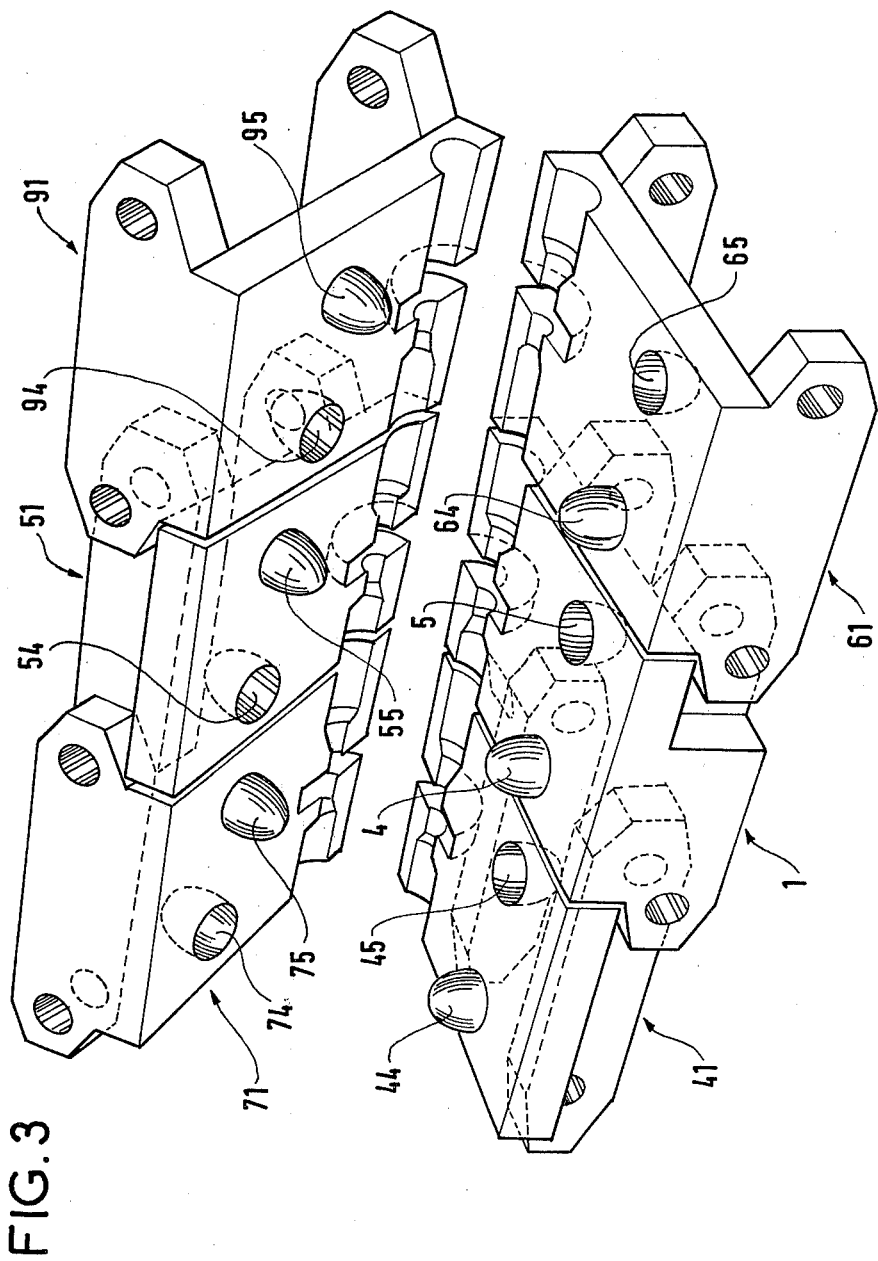
FIG. 3 is a perspective view of two groups of three elements of two cooperating chains.

FIG. 2 shows the unit 1 assembled with an identical unit 2, these units both being hermaphrodite. The unit 2 has a stud 24 and a hollow 25, a recess 26 to receive the central conductor and a cavity 17 for moulding an insulator disk. Its outer leading fixing tabs 28 and 29 have bores such as 32 which co-operate with the inner trailing tabs 10 and 11 of the unit 1 to pass a link pin 33. FIG. 2 also shows inner trailing tabs 30 and 31. FIG. 3 illustrates three units of a lower chain forming a male unit 41, a hermaphrodite unit 1, and a female unit 61. They are provided with respective studs 44, 4 and 64 from left to right and hollow 45, 5 and 65. The corresponding units of the upper chain comprise a female unit 71, a male unit 51 and a female unit 91 from left to right, each provided with a corresponding hollow as at 74, 54 and 94 and a stud as at 75, 55 and 95, adapted to cooperate respectively with studs and hollows of the units of the lower chain.

Figure 4:
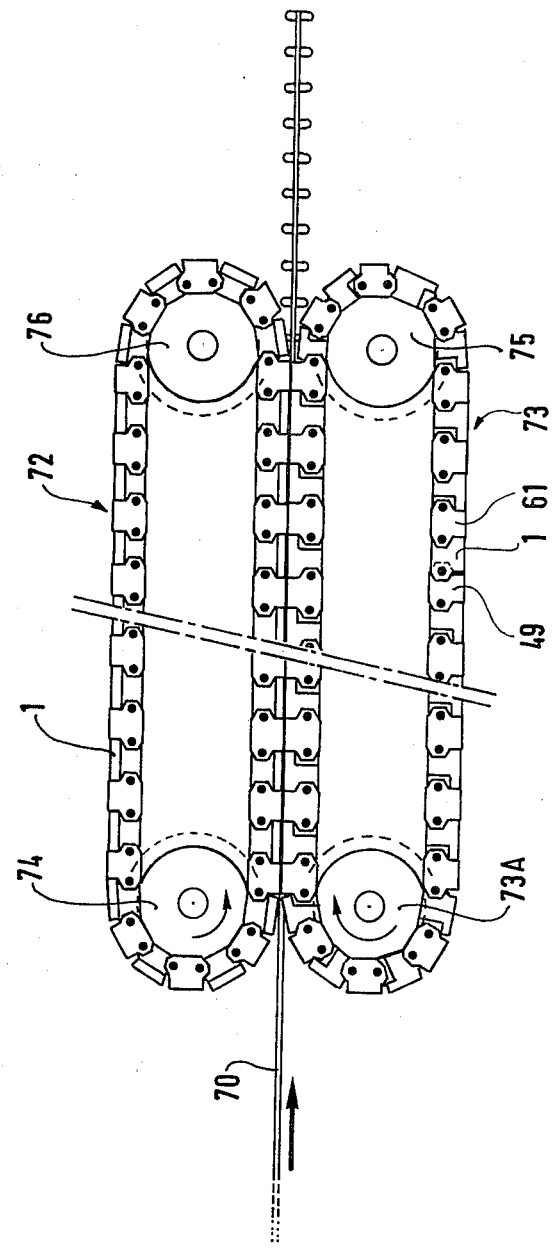
FIG. 4 is a side elevational view of two chains forming the illustrative embodiment of the invention through which travels an axial conductor for providing to the axial conductor plastic disk insulators in accordance with the present invention.

FIG. 4 is a side elevational view of a machine wherein the lower chain has one more unit formed by a hermaphrodite unit 1 than the upper chain 39 units. Lower chain 73 is driven over wheels 73A, 75 and upper chain 72 over wheels 74, 76. The incoming central conductor 70 has provided thereto, through the cooperation of the molding units of the two chains, the insulating disks which conductor bears at its outlet from the machine.

It is seen that units such as 1 can be assembled indiscriminately with any other analogous unit in the same chain or in between a male unit and a female unit in the same chain and that they can press against any other analogous unit of another insulator disk to form an moulding cavity. The number of moulding units in each of the sets can therefore be indiscriminately even or odd and can therefore differ by an odd number, in particular by one. Coaxial cables can thus be obtained in which defects in the insulator disks are repeated only at very long intervals. This greatly reduces attenuation due to the insulator disks.

Although the moulding units which have just been described with reference to the figures of the drawing appear to be the preferred embodiment of the invention, it will be understood that various modifications can be made thereto without thereby going beyond the scope of the invention, it being possible to replace some of their components by others which can perform analogous technical functions. In particular, the leading fixing tabs could be inner tabs and the trailing fixing tabs would then be outer tabs.

The invention applies particularly to manufacturing insulator disks on the central conductor of a coaxial cable.

We claim:

1. In a machine for manufacturing disks on a very long rod, said machine including two conveyor-driven chains of moulding units that press against one another and receive said rod therebetween in an area provided within abutting mating moulding units of said two chains with at least one orifice for injecting a mouldable substance into a cavity formed between a pair of mating units, one from each chain, the units then parting to release a disk-shaped part moulded onto said very long rod, the improvement wherein at least one of the chains of moulding units has at least one so-called "hermaphrodite" moulding unit with leading tabs and trailing tabs for fixing to its adjacent units, the gap between its leading tabs being different from the gap between its trailing tabs, and these two gaps being such that they allow said "hermaphrodite" unit to be inserted between a "female" unit with a wide gap between its tabs and a "male" unit with a narrow gap between its tabs or between two other, like, hermaphrodite units.

2. A machine according to claim 1, wherein one of the chains of units has a number of units that differs from that of the other chain of units, the difference being an odd number of hermaphrodite units.

3. A machine according to claim 2, wherein the number of units in the chains differs by one unit.

4. A machine according to claim 1, wherein each unit of each chain has a stud and a corresponding hollow, both being located on its surface facing a unit of the other chain for mating with a corresponding hollow and stud of a unit in the other chain.

5. A machine according to claim 1, wherein each unit of a first chain has a stud for mating with a stud of the corresponding unit of the first chain.

* * * * *